United States Patent
Scarlatti et al.

(10) Patent No.: US 9,643,507 B2
(45) Date of Patent: May 9, 2017

(54) RECHARGING AN AIRCRAFT BATTERY (71) Applicant: The Boeing Company, Huntington Beach, CA (US)

(72) Inventors: David Scarlatti, Madrid (ES); David Esteban Campillo, Madrid (ES); Enrique Casado, Madrid (ES); Fernando Caballero, Bajo A (ES); Ivan Maza, Cadiz (ES)

(73) Assignee: The Boeing Company, Chicago, IL (US)

( * ) Notice: Subject to any disclaimer, the term of this patent is extended or adjusted under 35 U.S.C. 154(b) by 243 days.

(21) Appl. No.: 14/461,761

(22) Filed: Aug. 18, 2014

(65) Prior Publication Data

US 2015/0097530 A1 Apr. 9, 2015

(30) Foreign Application Priority Data

Oct. 3, 2013 (EP) ..................................... 13382387

(51) Int. Cl.
*H02J 7/00* (2006.01)
*B60L 11/18* (2006.01)

(52) U.S. Cl.
CPC ............. *B60L 11/1827* (2013.01); *H02J 7/00* (2013.01); *H02J 2007/0001* (2013.01)

(58) Field of Classification Search
CPC .................................................... Y02T 90/14
USPC ......................................................... 320/109
See application file for complete search history.

(56) References Cited

U.S. PATENT DOCUMENTS

2003/0234320 A1* 12/2003 Colting ..................... B64B 1/02
244/96

FOREIGN PATENT DOCUMENTS

KR 2010 0050652 A 5/2010
KR 2010 0104113 A 9/2010

OTHER PUBLICATIONS

English Translation of KR 2010 0050652.*
European Search Report dated Apr. 4, 2014 for European Application No. 13 382 387.2, 10 pages.
European Examination Report dated Dec. 23, 2015 for Application No. 13 382 387.2.

* cited by examiner

*Primary Examiner* — Suresh Memula
(74) *Attorney, Agent, or Firm* — Womble Carlyle Sandridge & Rice LLP (57) ABSTRACT

And aircraft recharging station is provided for recharging an aircraft provided with a rechargeable battery. The recharging station includes a parking surface with conductive tiles selectively connected to an electrical power supply. The recharging station also includes a controller configured to determine a position of the aircraft on the parking surface by connecting, including being configured to iteratively connect a different pair of tiles to the electrical power supply to provide a circuit including positive and negative tiles connected thereto, and test an electrical circuit condition of the circuit, until a closed circuit condition is determined, thereby indicating that the aircraft is positioned on the positive and negative tiles, and that the battery is thereby rechargeable by the electrical power supply.

15 Claims, 9 Drawing Sheets

RECHARGING AN AIRCRAFT BATTERY

CROSS-REFERENCE TO RELATED APPLICATION(S)

The present application claims priority to European Patent Application No. EP13382387, entitled: Recharging an Aircraft Battery, filed Oct. 3, 2013, the content of which is hereby incorporated by reference in its entirety.

TECHNOLOGICAL FIELD

The present disclosure relates generally recharging an aircraft battery and, in particular, to an aircraft recharging pad and a method of recharging an aircraft with particular application to the autonomous recharging of unmanned aerial vehicles (UAVs).

BACKGROUND

There exists a problem with the battery life of relatively small unmanned air or aerial vehicles, for example those used in surveillance applications such as by the military, police, and fire-fighting services. Quadrotors (four-rotor helicopters) have become popular for such applications. These small unmanned air vehicles are rotorcraft that use four rotors mounted from a central body that carries surveillance equipment such as cameras (visible and/or infrared) and often computer memory to store still images or video collected.

The battery operating time is a limiting factor for small unmanned air vehicles where a full charge of the battery may provide only 15 to 20 minutes flight time. This places undesirable restrictions on the types of missions the unmanned air vehicles may perform, and imposes a critical limitation for many surveillance applications.

In the past, the problem of short battery life has been tackled from a battery design perspective, with improved battery design aimed at increasing battery life and/or reducing charging times. Other work has been performed on improving energy consumption of the unmanned air vehicles.

Therefore, it may be desirable to have a system and method that takes into account at least some of the issues discussed above, as well as possibly other issues.

BRIEF SUMMARY

Against this background, example implementations of the present disclosure are directed to recharging an aircraft battery. The battery may be provided in any type of aircraft, including rotorcraft and fixed-wing craft, and manned and unmanned aircraft. However, example implementations may bring particular benefit to the field of unmanned aircraft, particularly small unmanned aircraft with limited battery life.

Example implementations may make use of advances in battery design and/or energy consumption, such as using the latest generation of lithium polymer batteries. But example implementations are directed at an alternative approach to improving the utility of unmanned air vehicles. It will be appreciated that example implementations may bring the same benefit of improved recharging of a battery to other aircraft.

According to a first aspect, example implementations of the present disclosure reside in an aircraft recharging station, which may include a parking surface, a switching circuit and a controller. The parking surface may be disposed for an aircraft provided with a rechargeable battery to rest thereon, and may include conductive tiles. The switching circuit may be configured to allow selectively an electrical connection between an electrical power supply and any two of the tiles. That is, from all the tiles, the switching circuit may select any pair for connection to the power supply.

The controller of the aircraft recharging station may be configured to determine a position of the aircraft on the parking surface to allow recharging of the battery by the power supply. This may include the controller being configured to control the switching circuit to iteratively connect a different pair of the conductive tiles to the electrical power supply to provide a circuit including a positive tile and a negative tile connected to the electrical power supply, and test an electrical circuit condition of the circuit connected to the electrical power supply. The controller may continue until a closed circuit condition is determined, thereby indicating that the aircraft is positioned on the positive tile and the negative tile, and that the battery is thereby rechargeable by the power supply.

In some examples, each conductive tile of the conductive tiles may be provided with an electrical connector insulated from other, adjacent conductive tiles of the conductive tiles. In these examples, the electrical power supply may be provided with a positive output and a negative output. The switching circuit being configured to allow selectively an electrical connection between the electrical power supply and any two of the conductive tiles may include being configured to allow selectively an electrical connection between the positive output and the electrical connector of any conductive tile of the conducting tiles, and allow selectively an electrical connection between the negative output and the electrical connector of any other conductive tile of the conductive tiles.

In some examples, the aircraft may be provided with a positive terminal and a negative terminal connected to the battery, with the positive terminal and negative terminal both being arranged to be in contact with one or more of the conductive tiles when the aircraft is resting on the parking surface. In this regard, the position of the terminals may be such that they contact the parking surface when the aircraft lands. Alternatively, the terminals may be positioned such that they must be extended to contact the parking surface, such as when the aircraft has come to rest on the recharging station and its terminals contact two of the conductive tiles.

In some examples, the controller being configured to determine the position of the aircraft may include the controller being configured to control the switching circuit to connect the positive output of the power supply to the electrical connector of a conductive tile of the conductive tiles, and connect the negative output of the electrical power supply to the electrical connector of another conductive tile of the conductive tiles, thereby making the conductive tile the positive tile and the other conductive tile the negative tile. In these examples, the controller may also be configured to test the electrical circuit condition between the positive output and negative output of the electrical power supply. This may continue iteratively until the closed circuit condition is determined, thereby indicating that the positive output of the electrical power supply is connected to the positive terminal of the aircraft via the positive tile, and the negative output of the electrical power supply is connected to the negative terminal of the aircraft via the negative tile.

From a second aspect, example implementations of the present disclosure reside in an aircraft recharging station for recharging an aircraft including a rechargeable battery connected to a positive terminal and to a negative terminal that both contact one or more of the conductive tiles when the aircraft is resting on the parking surface. The aircraft may be arranged such that the positive and negative terminals always contact the parking surface when the aircraft rests on the parking surface, or the positive and negative terminals may be selectively deployed to contact the parking surface. The battery may be a lithium polymer battery.

The aircraft recharging station may include a parking surface disposed for the aircraft to rest on, either because the aircraft lands on the parking surface or because the aircraft lands elsewhere and taxis to the parking surface. The parking surface may include an array of conductive tiles each provided with an electrical connector. Hence, when the aircraft rests on the parking surface, the positive and negative terminals may contact some of the conductive tiles. Each conductive tile is insulated from the other conductive tiles. The conductive tiles may include metal or semiconductor, and the conductor may be plate-like or may be a grid. The outer surface of the conductive tiles may be conductive. Alternatively, inductive charging of the aircraft may be performed in which case the outer surface of the conductive tiles may be an insulator.

The aircraft recharging station may further include an electrical power supply with a positive output and a negative output, and a switching circuit. The switching circuit may be configured to allow selectively an electrical connection between the positive output of the electrical power supply and the electrical connector of any of the conductive tiles, and also to allow selectively an electrical connection between the negative output of the electrical power supply and the electrical connector of any of the conductive tiles. Hence, any of the conductive tiles may be connected to the positive output of the electrical power supply, and any of the conductive tiles may be connected to the negative output of the electrical power supply. However, as the conductive tiles are insulated from each other, an open circuit may exist when an aircraft is not present on the parking surface. This open circuit may be closed correctly by the aircraft if the aircraft is positioned on the parking surface with its positive terminal contacting the conductive tile connected to the positive output of the electrical power supply terminal, and with its negative terminal contacting the conductive tile connected to the negative output of the electrical power supply.

The aircraft may not need to be positioned in a particular way to ensure coincidence of its terminals to the correctly-connected conductive tiles. Instead, appropriate conductive tiles may be connected to the electrical power supply to correspond to the position with which the aircraft is resting on the parking surface. The recharging station may further include a controller configured to determine the position (e.g., linear and/or angular position) of the aircraft on the parking surface to allow recharging of the aircraft by the electrical power supply. The controller may be a suitably-programmed computer or an application-specific integrated circuit, hardware such as an electronic circuit configured to operate in the required manner, or any other well-known equivalent.

In some examples, the controller may be configured to determine the position of the aircraft on the parking surface using one or more setting steps and one or more testing steps, wherein a testing step is performed after each setting step. In the setting step, the controller may control the switching circuit to connect the positive output of the electrical power supply to the electrical connector of one of the conductive tiles thereby making that conductive tile a positive tile, and control the switching circuit to connect the negative output of the electrical power supply to the electrical connector of another of the conductive tiles thereby making that conductive tile a negative tile. In the testing step, the controller may test the electrical circuit condition between the positive and negative outputs of the electrical power supply. The setting step and the testing step may be repeated as necessary until the closed circuit condition is determined, thereby indicating that the power supply is correctly connected to the positive and negative terminals of the aircraft via the currently-set positive and negative tiles. At each setting step, the controller may select a different conductive tile to be the positive tile, select a different conductive tile to be the negative tile, or select different conductive tiles to be the positive and negative tiles.

In some examples, the controller may be configured to test the electrical circuit condition between the positive and negative power supply terminals by determining whether an open circuit condition exists. This may be the case if one (or both) of the positive and negative terminals of the aircraft is not contacting the positive or negative tiles. Such a circuit condition may be determined to be an incorrect circuit condition by the controller, and so the controller may proceed to the next setting step.

The controller may determine that a short circuit condition exists (from the aircraft's perspective). This may indicate that the positive and negative terminals of the aircraft are in contact with the same conductive tile (either the positive or negative tile), hence creating a short circuit. This again may correspond to an incorrect circuit condition. Rather than the controller proceeding to the next setting step, the controller may be configured to report this condition such that remedial action may be taken, such as repositioning the aircraft in an attempt to position the positive and negative terminals over different conductive tiles.

The controller may determine that a closed circuit exists, indicating that the positive and negative terminals are in contact with the positive and negative tiles. In some examples, the controller is configured merely to report this as a correct circuit condition. In other examples, the controller may be configured to determine the polarity of the closed circuit. An incorrect circuit condition may be determined by the controller if the wrong polarity is found, because the positive terminal is in contact with the negative tile and the negative terminal is in contact with the positive tile. In this case, the controller may be configured to proceed to the next setting step. A correct circuit condition may be determined by the controller if the correct polarity is found, corresponding to the positive and negative terminals being in contact with the positive and negative tiles respectively.

Further features according to various examples will now be described. These features may be used with the aircraft recharging station according to either the first or second aspects of example implementations of the present disclosure as have been described above.

In some examples, the controller may be configured to determine the position of an aircraft on the parking surface iteratively using an inner loop and an outer loop. The outer loop may include the controller iteratively or otherwise repeatedly setting the positive tile by controlling the switching circuit to connect the positive output of the electrical power supply to the electrical connector of each of the conductive tiles in turn, thereby potentially looping through all the conductive tiles if the last conductive tile set was in fact the conductive tile under the positive terminal of the aircraft. The inner loop may include after each time the controller has set the positive tile, the controller repeatedly setting the negative tile by controlling the switching circuit to connect the negative output of the electrical power supply to the electrical connector of each of the conductive tiles other than the positive tile in turn thereby potentially looping through all of the conductive tiles other than the positive tile. The controller may be configured to repeat iterations of the outer loop and the inner loop until the closed circuit condition is determined.

Rather than setting the positive tile in the outer loop and the negative tile in the inner loop, the negative tile may be set in the outer loop and the positive tile may be set in the inner loop. Thus, more generally, the outer loop may include the controller repeatedly setting either the positive tile or the negative tile by controlling the switching circuit to connect the positive or negative output of the electrical power supply to the electrical connector of each of the conductive tiles in turn thereby potentially looping through all the conductive tiles. The inner loop may include, after each time the controller has set the positive or negative tile, the controller repeatedly setting the other of the positive or negative tile by controlling the switching circuit to connect the other of the positive or negative output of the electrical power supply to the electrical connector of each of the conductive tiles other than the already-set positive or negative tile in turn thereby potentially looping through all of the conductive tiles other than the already-set tile. The controller may be configured to repeat iterations of the outer loop and the inner loop until the closed circuit condition is determined.

In some examples, the parking surface may include an array of conductive tiles arranged to fill the parking surface. That is to say, substantially no separation may be left between conductive tiles. In practice, a small separation may be left to ensure electrical isolation between the conductive tiles. For example, narrow insulating strips may be used to provide a small separation between the conductive tiles. The conductive tiles may be regular or irregular shapes, although in some examples, shapes may be chosen that may be tiled to leave no gaps. The conductive tiles may be congruent and arranged in a repeating pattern. For example, the conductive tiles may be triangular, square, rectangular or hexagonal in shape.

In certain examples, the inner loop may include, after each time the controller has set the positive or negative tile in the outer loop, the controller iteratively or otherwise repeatedly setting the other of the positive and negative tile by controlling the switching circuit to connect the other of the positive or negative output of the electrical power supply to the electrical connector of each of the conductive tiles adjacent to the already-set conductive tile in turn, thereby potentially looping through all of the adjacent conductive tiles. For example, when the positive tile is set in the outer loop, the inner loop may include, after each time the controller has set the positive tile in the outer loop, the controller repeatedly setting the negative tile by controlling the switching circuit to connect the negative output of the electrical power supply to the electrical connector of each of the conductive tiles adjacent to the positive tile in turn, thereby potentially looping through all of the adjacent conductive tiles.

Example implementations of the present disclosure also reside in a system including an aircraft and any of the aircraft recharging stations described above subject to the parking surface including an array of congruent, square conductive tiles. The aircraft may include a positive terminal that contacts the parking surface when the aircraft is resting on the parking surface and a negative terminal that contacts the parking surface when the aircraft is resting on the parking surface. The battery may be a lithium polymer battery. The positive terminal may be separated from the negative terminal by a distance greater than the length of a diagonal across a conductive tile of the parking surface but less than twice the width of a conductive tile of the parking surface. Such an arrangement may be particularly useful when the controller is operable to perform the inner loop by setting only conductive tiles adjacent the conductive tile already-set in the outer loop, as described above. This is because the separation of the positive and negative terminals ensures that they must contact adjacent conductive tiles no matter how the aircraft is positioned on the parking surface.

On the aircraft, landing feet, landing wheels, or extending members may form the positive and negative terminals of the aircraft. The aircraft may be any type of aircraft. For example, the aircraft may be manned or unmanned, fixed-wing craft or rotorcraft.

From a third aspect, example implementations of the present disclosure reside in a method of recharging a battery of an aircraft using a recharging station. The method may be computer-implemented.

The recharging station includes a parking surface disposed for the aircraft to rest thereon. The battery of the aircraft may be rechargeable, and the parking surface includes conductive tiles.

The method includes determining the position of the aircraft on the parking surface. This may include iteratively connecting a different pair of the conductive tiles to an electrical power supply of the recharging station to provide a circuit including a positive tile and a negative tile connected to the electrical power supply. The electrical circuit condition of the circuit connected to the electrical power supply after each connection is made may be tested until a closed circuit condition is determined, thereby indicating that the aircraft is positioned on the positive tile and the negative tile, and that the battery is thereby rechargeable by the electrical power supply. The battery may then be recharged using the electrical power supply as connected to the aircraft via the positive tile and the negative tile.

In some examples, the electrical power supply may be provided with a positive output and a negative output. In these examples, iteratively connecting a different pair of the conductive tiles to the electrical power supply may include iteratively connecting the positive output of the electrical power supply to a conductive tile to provide the positive tile, and connecting the negative output of the electrical power supply to a conductive tile to provide the negative tile.

In some examples, the aircraft may be provided with a positive terminal and a negative terminal connected to the battery. In these examples, the positive terminal and negative terminal may both be arranged to be in contact with one or more of the conductive tiles when the aircraft is resting on the parking surface.

Determining the position of the aircraft on the parking surface in the aforementioned examples may include connecting the positive output of the electrical power supply to a conductive tile of the conductive tiles, and connecting the negative output of the electrical power supply to another conductive tile of the conductive tiles, thereby making the conductive tile the positive tile and the other conductive tile the negative tile. And the electrical circuit condition between the positive output and negative output of the electrical power supply may be tested. Connecting the positive output and negative output of the electrical power supply, and determining the electrical circuit condition, are iteratively performed until the closed circuit condition is determined, thereby indicating that the positive output of the electrical power supply is connected to the positive terminal of the aircraft via the positive tile, and the negative output of the electrical power supply is connected to the negative terminal of the aircraft via the negative tile.

From a fourth aspect, example implementations of the present disclosure reside in a method of recharging an aircraft using a recharging station. The method may be computer-implemented.

The aircraft may include a rechargeable battery connected to a positive terminal that contacts the parking surface when the aircraft is resting on the parking surface and to a negative terminal that contacts the parking surface when the aircraft is resting on the parking surface. The battery may be a lithium polymer battery.

The aircraft recharging station may include a parking surface disposed for an aircraft to rest thereon, and the parking surface may include an array of conductive tiles that are insulated from each other and an electrical power supply with a positive output and a negative output. Each conductive tile may be insulated from the other conductive tiles. The conductive tiles may include metal or a semi-conductor, and the conductor may be plate-like or may be a grid. The outer surface of the conductive tiles may be conductive. Alternatively, inductive charging of the aircraft may be performed in which case the outer surface of the conductive tiles may be insulating.

The method of this fourth aspect may include determining the position of the aircraft on the parking surface using one or more setting steps and one or more testing steps, wherein a testing step is performed after each setting step. The setting step may include connecting the positive output of the electrical power supply to one of the conductive tiles thereby making that conductive tile a positive tile, and connecting the negative output of the electrical power supply to another of the conductive tiles thereby making that conductive tile a negative tile. The testing step may include determining the electrical circuit condition between the positive and negative outputs of the electrical power supply. The setting step and the testing step are repeated as necessary until a closed circuit condition is determined, thereby indicating that the electrical power supply is connected to the positive and negative terminals of the aircraft via the current positive and negative tiles. The method may further include recharging the battery of the aircraft using the electrical power supply as correctly connected to the aircraft via the current positive and negative tiles.

Further features according to various examples will now be described. These features may be used with either the method according to the third aspect or fourth aspect of example implementations of the present disclosure as have been described above.

In some examples, the method may include determining the electrical circuit condition between the positive and negative outputs of the electrical power supply by determining whether an open circuit condition exists. This may be the case if either (or both) of the positive and negative terminals of the aircraft is not contacting the positive or negative tiles. Such a circuit condition may be determined to be an incorrect circuit condition, and so the method will proceed to the next setting step.

The method may include determining that a short circuit condition exists. This may indicate that the positive and negative terminals of the aircraft are in contact with the same conductive tile (either the positive or negative tile). This again may correspond to an incorrect circuit condition. Rather than the method proceeding to the next setting step, the method may include reporting this condition such that remedial action may be taken, such as repositioning the aircraft in an attempt to position the positive and negative terminals over different conductive tiles.

The method may include determining that a closed circuit exists, indicating that the positive and negative terminals are in contact with the positive and negative tiles. In some examples, this may be merely reported as a correct circuit condition. In other examples, the polarity of the closed circuit may be checked. An incorrect circuit condition may be determined if the wrong polarity is found, because the positive terminal is in contact with the negative tile and the negative terminal is in contact with the positive tile. In this case, the method may proceed to the next setting step. A correct circuit condition may be determined if the correct polarity is found, corresponding to the positive and negative terminals being in contact with the positive and negative tiles respectively.

The method may include determining the position of the aircraft on the parking surface iteratively using an inner loop and an outer loop. The outer loop may include repeatedly setting either the positive or negative tile by connecting the positive or negative output of the electrical power supply to each of the conductive tiles in turn, thereby potentially looping through all the conductive tiles. The inner loop may include, after each time the positive or negative tile is set, repeatedly setting the other of the positive and negative tile by connecting the other of the positive and negative output of the electrical power supply to each of the conductive tiles other than the already-set conductive tile in turn, thereby potentially looping through all of the conductive tiles other than the already-set conductive tile. The method may include repeating iterations of the outer loop and the inner loop until the correct circuit condition is determined.

In some examples, the inner loop may include, after each time the positive or negative tile is set in the outer loop, repeatedly setting the other of the positive and negative tile by connecting the other of the positive and negative output of the electrical power supply to each of the conductive tiles adjacent to the already-set conductive tile in turn thereby potentially looping through all of the adjacent conductive tiles. This may be done by selecting the adjacent conductive tiles in turn in a clockwise or anti-clockwise direction. In the outer loop, the method may include setting the positive or negative tile repeatedly by selecting the next positive or negative tile from one of the adjacent conductive tiles of the previously-set positive or negative tile. This may be done in an ordered sequence.

The outer loop may include setting the positive tile using the positive output of the electrical power supply, and the inner loop then may include setting the negative tile using the negative output of the electrical power supply by selecting in turn the conductive tiles adjacent to the positive tile. Alternatively, the outer loop may include setting the negative tile using the negative output of the electrical power supply, and the inner loop then may include setting the positive tile using the positive output of the electrical power supply by selecting in turn the conductive tiles adjacent to the negative tile.

The features, functions and advantages discussed herein may be achieved independently in various example implementations or may be combined in yet other example implementations further details of which may be seen with reference to the following description and drawings.

BRIEF DESCRIPTION OF THE DRAWINGS

In order that example implementations of the present disclosure may be more readily understood, reference will now be made to the accompanying drawings, which are not necessarily drawn to scale, and wherein.

DETAILED DESCRIPTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being to the left of something else (unless otherwise indicated) may instead be to the right, and vice versa. Like reference numerals refer to like elements throughout.

Figure 1:
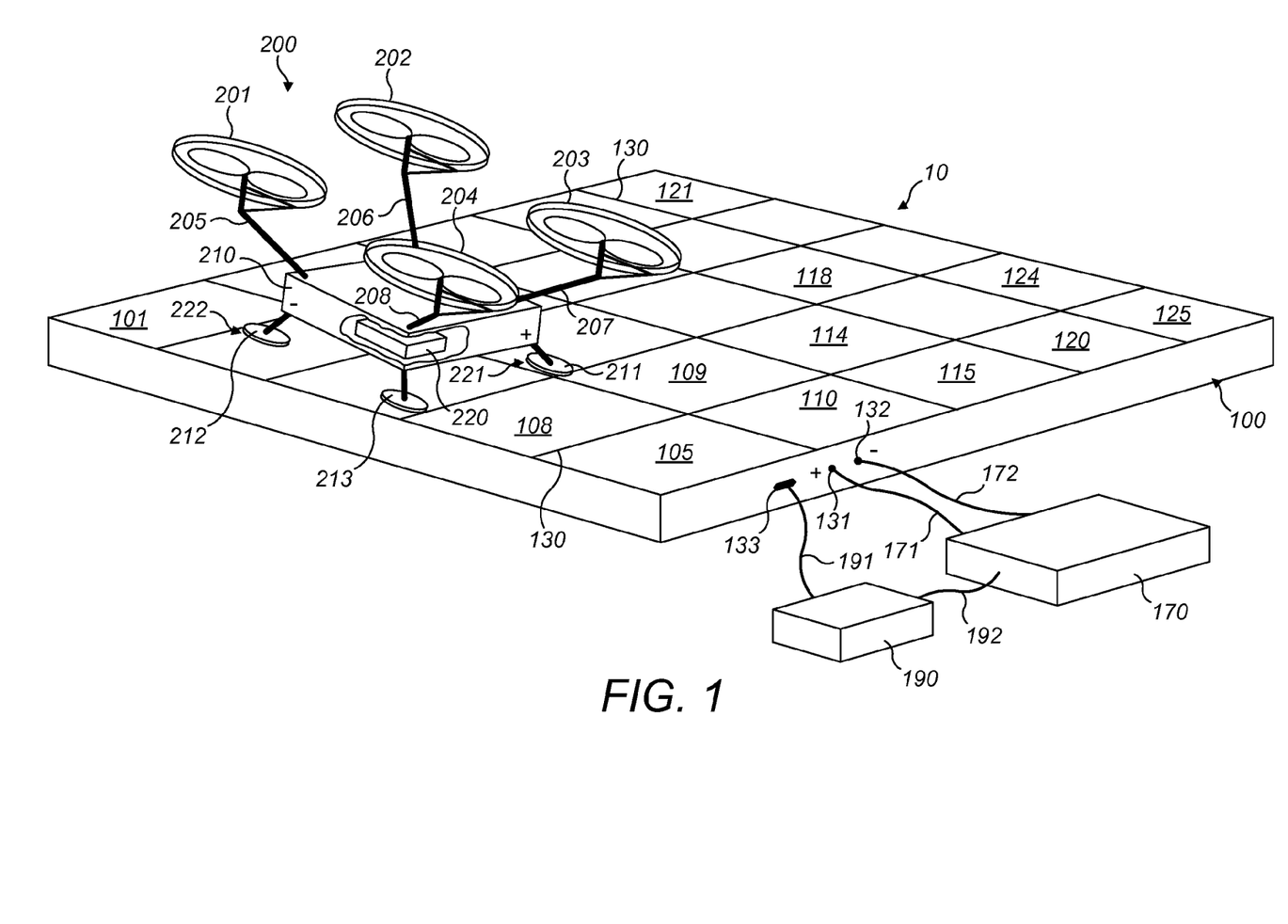
FIG. 1 is simplified representation of an unmanned rotorcraft stationed on a recharging pad during recharging at a recharging station, shown in perspective, according to example implementations of the present disclosure.
Figure 2:
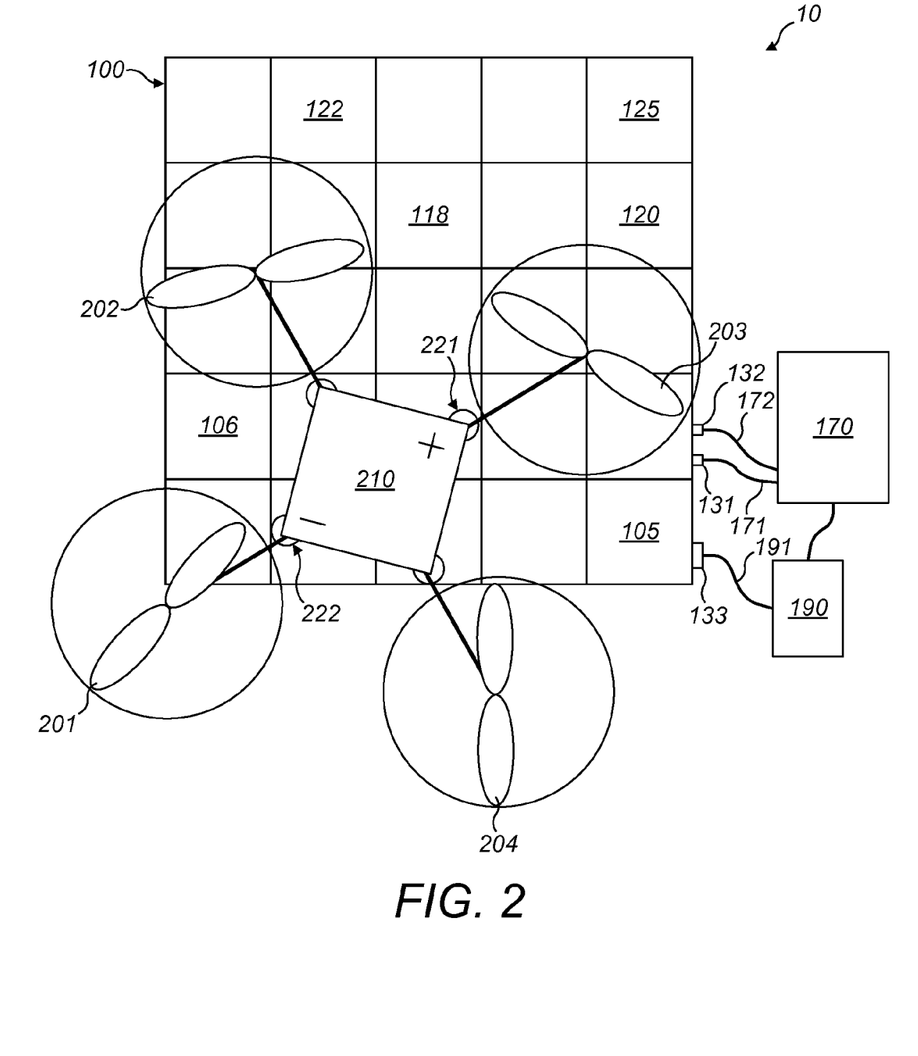
FIG. 2 corresponds to FIG. 1, but shown as a plan view, according to example implementations.

FIGS. 1 and 2 show simplified representations of a system including an aircraft recharging station 10 for recharging aircraft like the rotorcraft 200 shown in the figures. In this example, the rotorcraft 200 may include a main body 210 from which are mounted four shielded rotors 201, 202, 203, 204 on four support arms 205, 206, 207, 208. When on the ground or the recharging station 10, the rotorcraft 200 is supported on four feet 211, 212, 213, 214 that are attached to the body 210 by legs.

Although not shown in the figure, the body 210 of the rotorcraft 200 houses various components that allow the rotorcraft 200 to operate. These include a computer processor that may be programmed to co-ordinate operation of the rotorcraft 200. For example, the processor may be programmed with mission plans and may then execute the mission plans by causing the rotorcraft 200 to fly according to the flight plan defined in the mission plan. The processor may control each of the four rotors 201 to 204 independently to move the rotorcraft 200 in all directions. In this example, each of the rotors 201 to 204 is powered by an electric motor (not shown), although a single electric motor may power all the rotors 201 to 204 (for example, via gears to alter the power delivered to each rotor).

Electrical power is supplied to the motors from a rechargeable lithium-polymer battery 220 (or other type of electrical storage device), also housed within the body 210 as can be seen through the break-away section of FIG. 1. Even where the rotors 201 to 204 are not powered by electric motors, the rotorcraft 200 may still require a battery 220 to provide electrical power, for example to power the processor.

One of the feet 211 is provided on its underside with an electrical terminal 221 that forms a positive connection to the battery 220. Another of the feet 212 is provided on its underside with an electrical terminal 222 that forms a negative connection to the battery 220. As described, the feet 211, 212 are configured to mate electrically with a corresponding electrical terminal 221, 222. In this example, the remaining feet 213 and 214 may not include electrical terminals on their underside.

As shown in the figures, the feet 211 to 214 may be of a relatively large size to provide stability and to prevent sliding of the rotorcraft 200 when on the recharging station 10 or on the ground. The positive terminal 221 and the negative terminal 222 may have a much smaller size when compared to the feet 211 and 212 that support them. The reason for this will be explained below.

The recharging station 10 may include a parking surface corresponding to a landing pad 110 formed, in this example, of an array of square tiles 101, 102, 103, 104, 105, 106, 107, 108, 109, 110, 111, 112, 113, 114, 115, 116, 117, 118, 119, 120, 121, 122, 123, 124, 125. The rotorcraft 200 may land directly on the landing pad 110. The recharging station may further include a power supply 170 and a controller 190.

The controller 190 is connected to the power supply 170 via connection 192 such that the controller 190 can control operation of the power supply 170. The controller 190 is also connected to the landing pad 100 via a cable 191 that is received in a socket 133 of the landing pad 100. This allows the controller 190 to control operation of the landing pad 100 as will be described in more detail below. The power supply 170 is provided with a positive output and a negative output that are connected to a positive connection 131 and a negative connection 132 of the landing pad 100 respectively via cables 171 and 172.

In this example, the landing pad 100 has an array of twenty-five congruent square tiles 101 to 125 arranged to form a regular five by five grid with five rows and five columns. Each tile 101 to 125 is electrically conductive, and is separated from adjacent tiles with insulating strips 130 that extend between the rows and columns. For example, each tile may include a highly conductive surface, such as a metal layer, metal alloy, or metal coating, and the insulating strips may be made of non-conducting materials such as rubber or plastic. Because the landing pad may be exposed to adverse weather, the tiles may be composed of a corrosion-resistant material, such as gold or thin stainless steel.

The underside of each tile 101 to 125 is provided with an electrical connector to provide a secure electrical connection for each tile 101 to 125 to a switching circuit. The switching circuit is also connected to the positive connection 131 and the negative connection 132, and to the controller 190 via socket 133. The switching circuit provides an electrical connection circuit: the controller 190 is configured to control the switching circuit such that each tile 101 to 125 may be connected to either the positive connection 131 or the negative connection 132. In this way, the controller 190 may select any combination of two tiles 101 to 125 to be connected to the power supply 170 via the positive connection 131 and the negative connection 132 thereby forming positive and negative tiles on the landing pad 100.

These positive and negative tiles may be used to recharge the battery 220 of the rotorcraft 200 when the tiles are in contact with the positive terminal 221 and the negative terminal 222 of the rotorcraft 200. However, the rotorcraft 200 does not have to land on the landing pad 100 in a predetermined position. The rotorcraft 200 may land on the landing pad 100 in any position, and the controller 190 will determine the position and arrange the electrical connections to the tiles 101 to 125 of the landing pad 100 accordingly. As described herein, the position of the aircraft may refer to its linear position, angular position (orientation), or combination of its linear position and angular position.

In this example, the separation of the positive terminal 221 and the negative terminal 222 of the rotorcraft 200 is chosen to be greater than the maximum extent of each tile 101 to 125, i.e., the separation of the terminals 221 and 222 is greater than the length of a diagonal across a tile 101 to 125. This ensures that the rotorcraft 200 cannot land on the landing pad 100 with both terminals 221 and 222 resting on the same tile 101 to 125. Although the larger size of the feet 211 to 214 may mean one or more feet 211 to 214 overlap tiles 101 to 125, the small size of the positive terminal 221 and the negative terminal 222 means that the chances of either terminal 221 or 222 extending across adjacent tiles 101 to 125 is very small. In any event, the above-described separation of the terminals 221 and 222 still ensures that a single tile 101 to 125 may not be in contact with both the rotorcraft's positive and negative terminals 221 and 222 simultaneously. Where a terminal 221 or 222 extends across two or more tiles 101 to 125, any single or any combination of the contacting tiles 101 to 125 may be used as the positive or negative tile to connect the overlapping terminal 221 or 222 to the power supply 170.

A method 300 of determining the position of the rotorcraft 200 will now be described with reference to FIG. 3, and as further illustrated by FIGS. 4A-4C, 5A-5H, to 6A-6F. The method 300 begins at step 302 when the rotorcraft 200 lands on the landing pad 100. The rotorcraft 200 may locate the landing pad 100 in any conventional way. A landing event may be detected using any known method, for example using pressure sensitive switches, video monitoring, audio monitoring, and one or more radiation beams such as the breaking of a light beam.

The method 300 then continues along line 303 to enter an outer loop 304 within which an inner loop 306 resides. The method proceeds to step 308, where the controller 190 configures the switching circuit such that a first tile 101 is connected to the positive connection 131 and becomes a positive tile. In this example, the first tile selected is the tile 101 in the lower left hand corner of the landing pad 100.

With the first positive tile selected at step 308, the method 300 continues along line 309 to enter the inner loop 306 and proceeds to step 310. At step 310, the controller 190 configures the switching circuit such that a first tile 102 is connected to the negative connection 132 and becomes a negative tile. In this example, the first tile selected as the negative tile is the tile to the right of the centre of the positive tile.

Figure 4A:
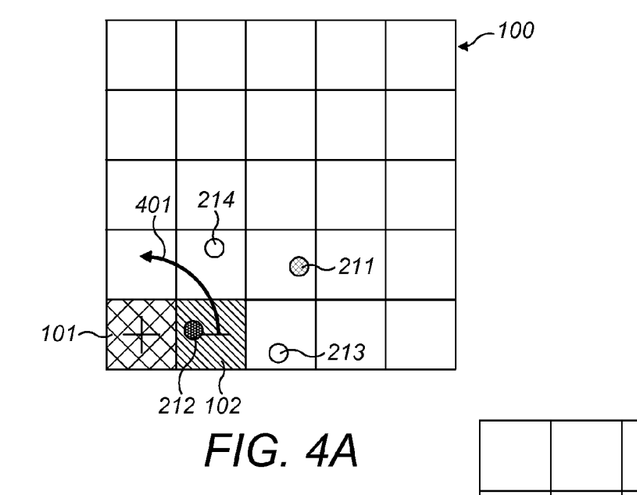
FIGS. 4A, 4B and 4C show schematically the recharging pad and the landing feet of the rotorcraft of FIGS. 1 and 2, and illustrate an inner loop of a sequence used to determine the position of the rotorcraft, according to example implementations.
Figure 4B:
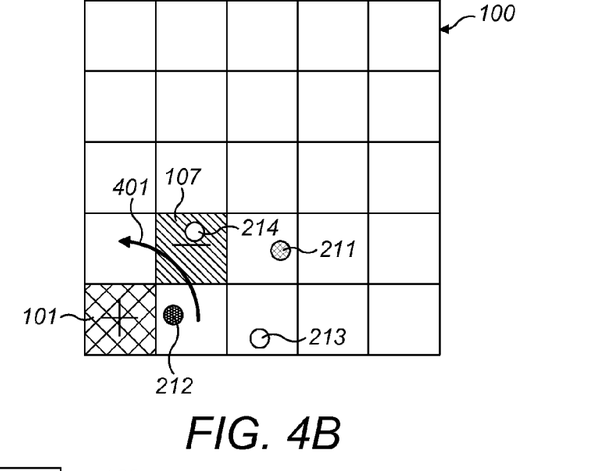
Figure 4C:
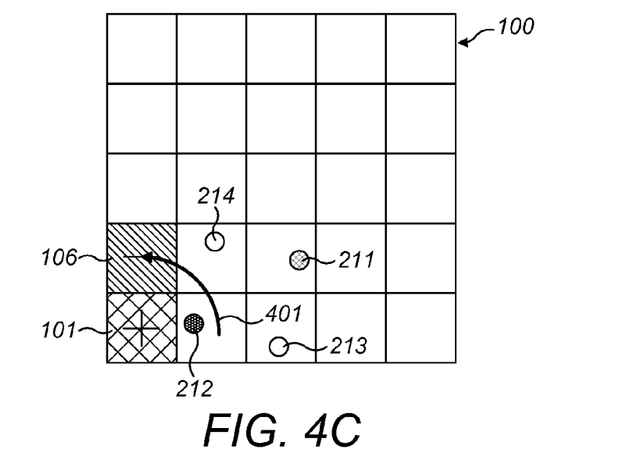

FIG. 4A shows this arrangement schematically. FIGS. 4A to 4C each show the landing pad 100 and the feet 211 to 214 of the rotorcraft 200 where the feet rest on the tiles 102, 103, 107 and 108 of the landing pad 100. FIG. 4A shows tile 101 set as the positive tile and tile 102 set as the negative tile.

The method 300 then proceeds along line 311 to step 312 where the circuit condition is tested. This line 311 to step 312 sees the controller 190 test the circuit formed between the positive and negative outputs of the power supply 170 connected to the positive and negative connections 131, 132 of the landing pad 100. A pass or fail condition is achieved or detected depending on the following.

A pass condition is achieved when the positive tile and the negative tile are correctly located beneath the positive terminal 221 and the negative terminal 222 respectively of the rotorcraft 200. In this case, a complete circuit is formed and the controller 190 will register a closed circuit having the correct polarity. If the controller 190 determines a pass condition at step 312, the method continues along line 313 to step 314 where recharging of the battery 220 begins.

On the other hand, a fail condition is achieved in either of the following arrangements:

(i) the positive tile is located beneath the negative terminal 222 and the negative tile is located beneath the positive terminal 221 such that a complete circuit is formed, and the controller 190 will determine a closed circuit but having an incorrect polarity; or (ii) a connection fails to be made, either because one of the positive or negative tiles is set in a position that does not coincide with one of the terminals 221 and 222 or because both the positive and negative tiles are set in positions that do not coincide with the terminals 221 and 222. In either case, the controller 190 will determine an open circuit.

In examples where rotorcraft 200 has positive and negative terminals 221 and 222 separated by less than the length of the diagonal across each tile 101 to 125, it is possible for a third fail condition. This fail condition corresponds to a short circuit caused by both the positive terminal 221 and the negative terminal 222 of the rotorcraft 200 resting on either the positive tile or the negative tile, such that the controller 190 determines a short circuit. When a short circuit is detected because the positive and negative terminals 221 and 222 of the rotorcraft 200 are connected directly together, the method may continue along path 328 to step 324 where the failed operation may be reported, and the rotorcraft 200 may then be prompted to take off at step 332 and attempt a further landing on the landing pad 100 at step 302.

In the present case shown in FIG. 4A, tile 102 beneath the negative terminal 222 is correctly set as the negative tile, but tile 101 that is set as the positive tile is not the tile beneath the positive terminal 221. Hence, the controller 190 determines a fail condition at step 312, and the method 300 continues around the inner loop 306 by proceeding to step 316 via line 315. In the inner loop 306, the controller 190 maintains the connection to the positive tile, but reassigns the negative tile by moving the electrical connection from the power supply 170 from one tile 101 to 125 to the next. In this example, the separation of the positive terminal 221 and the negative terminal 222 of the rotorcraft 200 is chosen to be less than twice the width of each square tile 101 to 125 such that the positive and negative terminals 221 and 222 must reside on adjacent tiles 101 to 125. With this arrangement, the controller 190 may simply reassign the negative tile to be each of the tiles adjacent the positive tile in turn. The controller 190 connects in turn each adjacent tile to the negative connection 132 in an anti-clockwise sequence. Hence, in the present case where tile 101 is selected as the positive tile, the controller 190 selects tiles 102, 107 and 106 in turn as the negative tile as indicated by arrow 401 in FIGS. 4A to 4C.

So returning to the method 300, the above explanation describes how the first positive tile is set at step 308, the first negative tile is set at step 310, the circuit condition test at step 312 is failed, and the method proceeds to step 316 where a further test is performed. The method at step 316 tests to see if all adjacent tiles have been set as the negative tile. Assuming this not to be the case, the method 300 continues along line 317 to step 318 where the controller 190 assigns the next adjacent tile (tile 107) as the negative tile. The method 300 then continues along line 319 back to step 312 where the circuit condition is again tested.

As will be appreciated, the inner loop 306 sees further iterations of steps 316, 318 and 312 such that the controller 190 assigns in turn each of the adjacent tiles as the negative tile all the while the circuit condition test is failed at step 312. Eventually all tiles 102, 107 and 106 adjacent the positive tile 101 will be set as the negative tile. When the test step 312 is failed with the last tile 106 assigned as the negative tile, the outcome of test step 316 will indicate that the last tile in the negative tile sequence has been assigned. Thus, the method 300 exits the inner loop 306 via path 321 to allow a further iteration of the outer loop 304.

Each iteration of the outer loop 304 sees the controller 190 assign another tile 101 to 125 as the positive tile. This is performed by the method 300 progressing along line 321 to step 322 where an initial check is made to ensure that not all tiles 101 to 125 have already been assigned as the positive tile. That is, if step 322 determines that the last tile in the positive tile sequence is assigned as the positive tile, then all tile combinations have been tested without the position of the rotorcraft 200 having been determined. In this case, the method 300 exits the outer loop 325 by continuing along line 323 to step 324 where the controller 190 generates a report that the operation failed.

Figure 3:
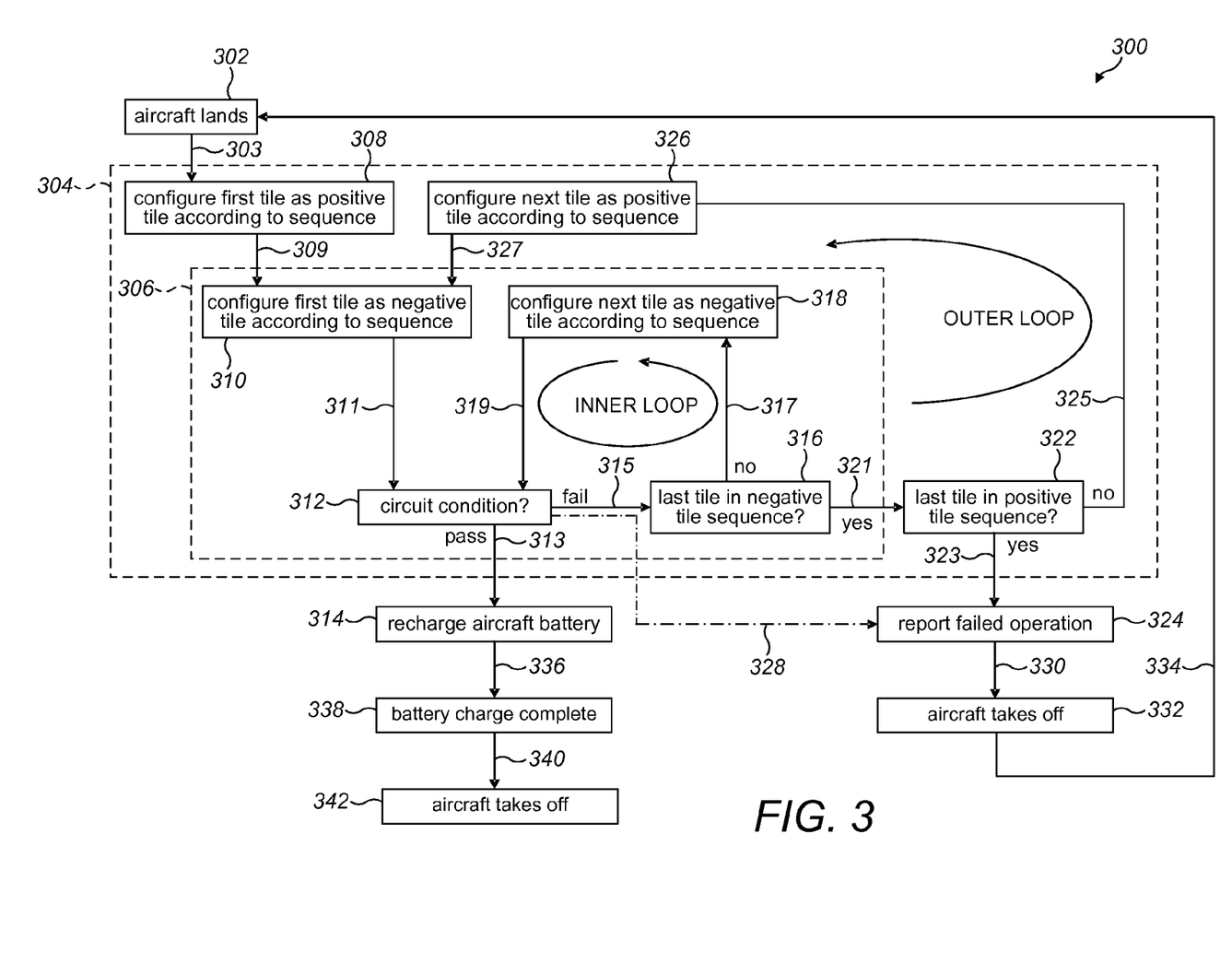
FIG. 3 is a schematic representation of how the arrangement of FIGS. 1 and 2 may be used to recharge a battery of the rotorcraft, according to example implementations.

Optionally, and as shown in FIG. 3, the method 300 may then continue along line 330 to step 332 where a command is issued to the rotorcraft 200 to take off. The rotorcraft 200 duly takes off and lands once more on the landing pad 110, i.e., the method returns along line 334 to step 302 and another attempt is made to charge the battery 220 of the rotorcraft 200. Changing the position of the rotorcraft 200 on the landing pad 110 will increase the chances of the further charging attempt to be successful. Often, the mere act of taking off, gaining a few feet in altitude and landing again will be enough to cause the rotorcraft 200 to adopt a different position on the landing pad 110, for example because of the effect of the wind on the rotorcraft 200. Of course, the rotorcraft 200 may be controlled to ensure it adopts a different position, for example by rotating the rotorcraft about a vertical axis, by any well known means.

Returning to step 322, the description above was for the case that all tiles had been assigned as the positive tile. Returning to the previous description, only the first tile 101 has been set as the positive tile so far, such that the outcome of test 322 is no (the last tile in the positive tile sequence is not assigned as the positive tile). In this case, the method 300 continues along line 325 to step 326 where the controller assigns the next tile as the positive tile.

Figure 5A:
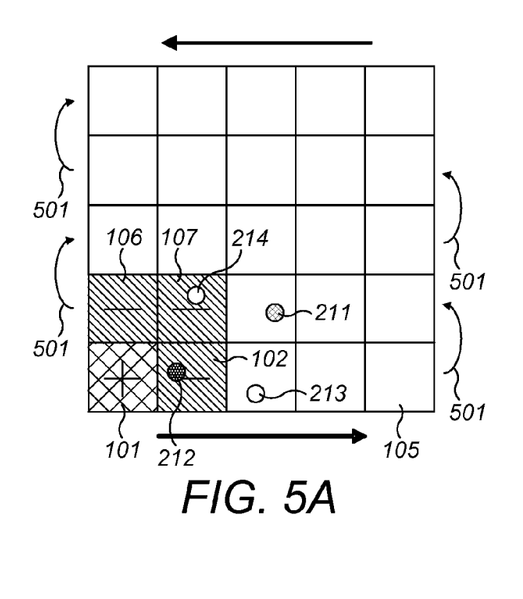
FIGS. 5A, 5B, 5C, 5D, 5E, 5F, 5G and 5H show schematically the recharging pad and the landing feet of the rotorcraft of FIGS. 1 and 2, and illustrate an outer loop of a sequence used to determine the position of the rotorcraft, according to example implementations.
Figure 5B:
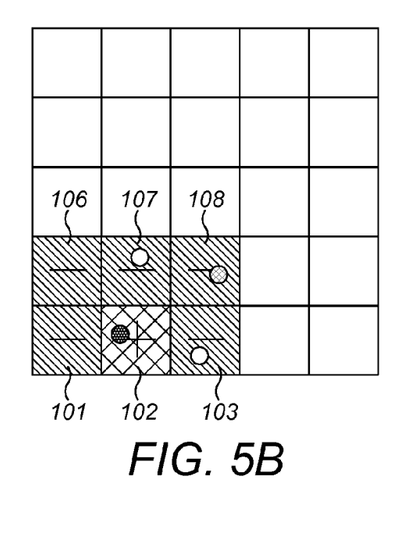
Figure 5C:
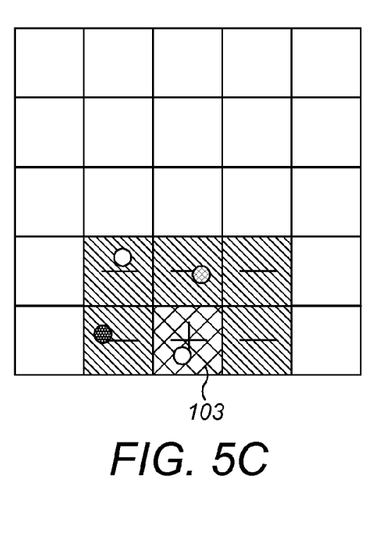
Figure 5D:
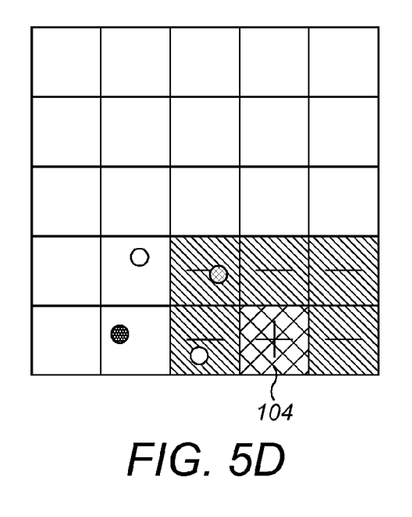

In this example, the controller follows a sequence through the tiles 101 to 125 row by row, alternating from travelling from left to right to travelling from right to left, as shown in FIG. 5A by the arrows 501. FIGS. 5A to 5H show schematically how the positive tiles are assigned in the outer loop 304, and also show all the negative tiles assigned during the iterations of each inner loop 306 for each iteration of the outer loop 304. As can be seen in FIGS. 5A to 5H, tiles are selected according to the sequence 101=>102=> 103=>104=>105=>110=>109=>108=>107=>106=>111=> 112=>113=>114=>115=>120=>119=>118=>117=>116=> 121=>122=>123=>124=>125.

Figure 5E:
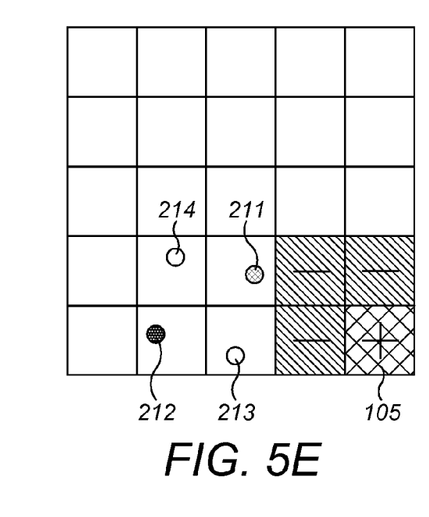
Figure 5F:
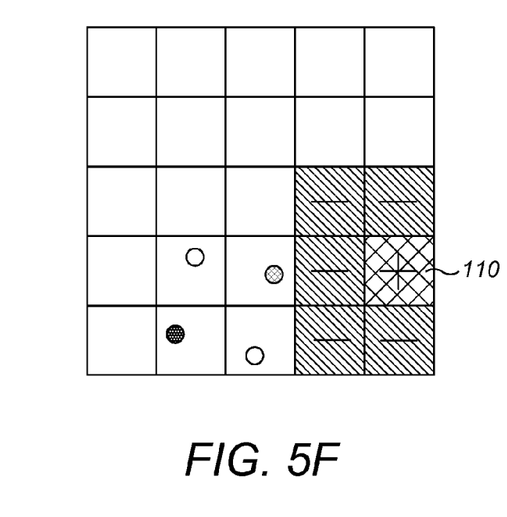
Figure 5G:
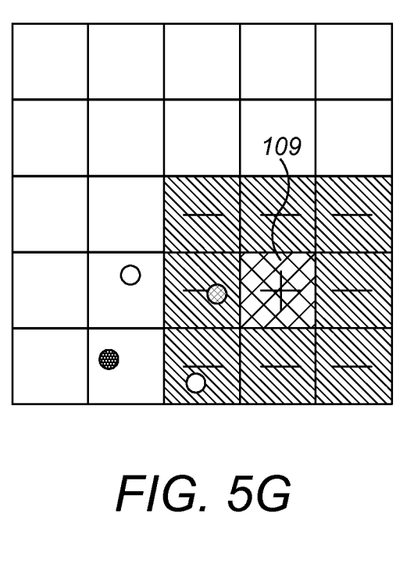
Figure 5H:
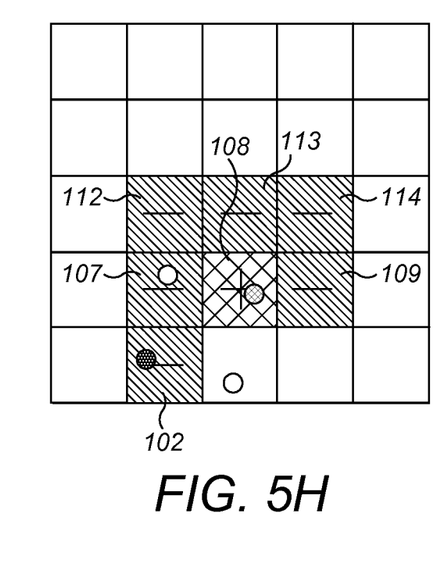

With the next tile 102 assigned as the positive tile at step 326, the method 300 continues along line 327 to re-enter the inner loop 306 by returning to step 310 where the controller 190 assigns the first tile as the negative tile. This will be tile 103 remembering that the first tile assigned is the tile to the right of the centre of the positive tile 102. For some positive tiles, like tile 105 being assigned as the positive tile as shown in FIG. 5E, there is no tile to the right of centre: in this case, the first available tile according to the usual anti-clockwise sequence is assigned as the negative tile (tile 110).

With tile 102 assigned as the positive tile, the inner loop 306 iterates with the controller 190 reassigning in turn the negative tile to the adjacent tiles 103, 108, 107, 106 and 101 all the while test step 312 indicates a fail condition. This is shown schematically in FIG. 5B where all tiles 103, 108, 107, 106 and 101 are shown as assigned as the negative tile.

Each time the inner loop 306 completes without test step 312 producing a pass condition, the outer loop 304 iterates such that each tile 101 to 125 may be, in principle, assigned in turn to be the positive tile. This is indicated in FIGS. 5A to 5H where it can be seen that the positive tile is reassigned to tiles 101, 102, 103, 104, 105, 110, 109 and then to tile 108.

Figure 6A:
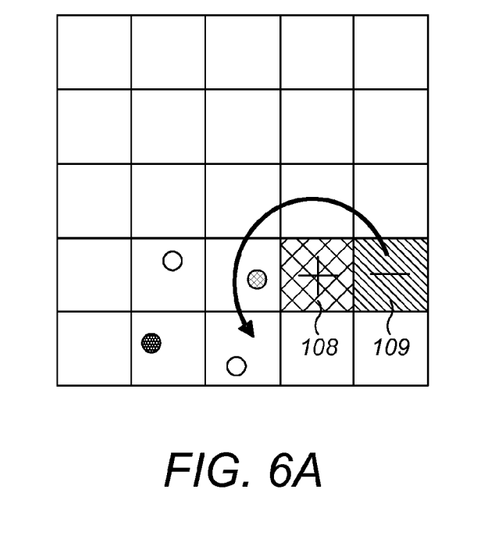
FIGS. 6A, 6B, 6C, 6D, 6E and 6F show schematically the recharging pad and the landing feet of the rotorcraft of FIGS. 1 and 2, and illustrate an inner loop of a sequence used to determine the position of the rotorcraft, including the final step when the position is determined, according to example implementations.
Figure 6B:
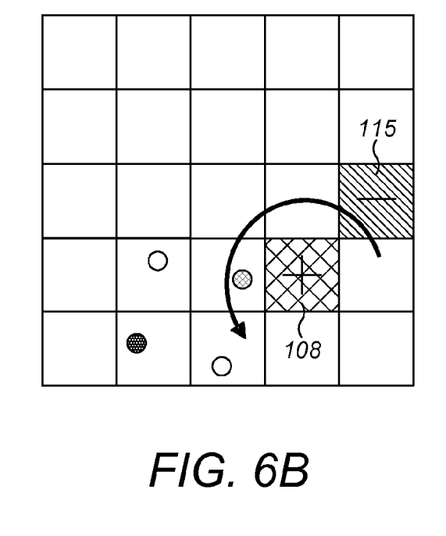
Figure 6C:
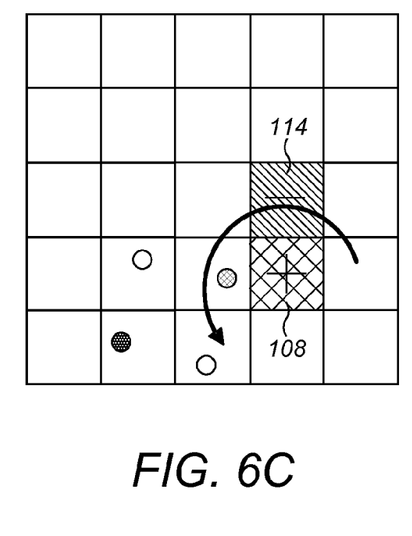
Figure 6D:
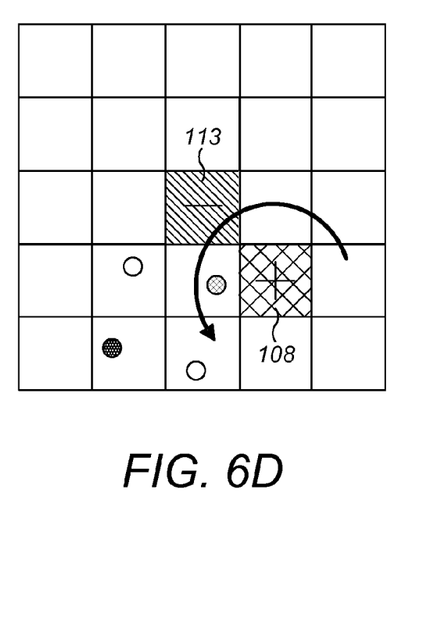
Figure 6E:
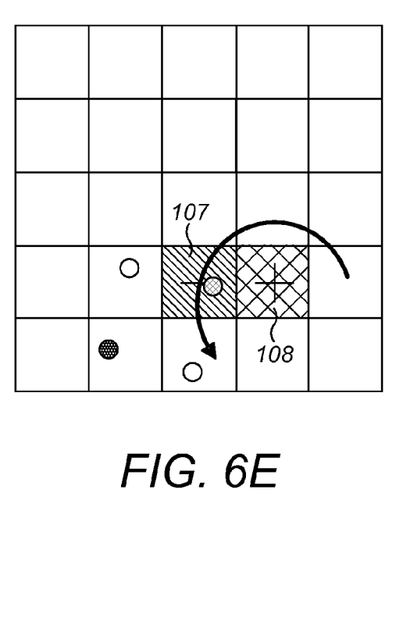
Figure 6F:
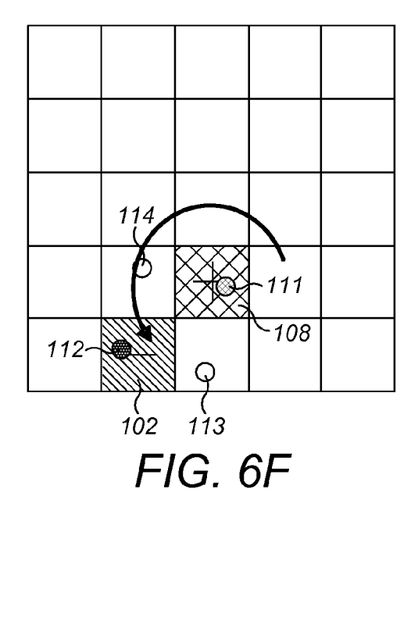

Tile 108 is the tile upon which the positive terminal 221 of foot 211 rests. So, returning to method 300, the method will have proceeded to step 326 where the controller 190 has connected tile 108 to the positive connection 131 such that tile 108 is assigned as the positive tile. The method then joins the inner loop 306 once more at step 310 where the controller 190 first assigns tile 109 as the negative tile. This will result in test step 312 producing a fail condition, and so the inner loop 306 iterates through tiles 114, 113, 112 and 107 being assigned by the controller 190 as the negative tile as indicated in FIGS. 6A to 6E. In each iteration, test step 312 produces a fail condition. However, eventually step 318 sees the controller assign tile 102 as the negative tile. Now, the rotorcraft 200 has positive terminal 221 resting on tile 108 that is assigned to be the positive tile, and negative terminal 222 resting on tile 102 that is assigned to be the negative tile, as indicated in FIG. 6F. Thus, when the controller 190 performs step 312, a pass condition is obtained and the method 300 proceeds along line 313 to step 314 where, as described above, the battery 220 of the rotorcraft 200 is recharged, as indicated by line 336. At step 338, a determination that the battery 220 is recharged is made, the determination of which is known in the art. The method proceeds along line 340 to step 342 where the rotorcraft 200 is instructed to or cleared for take off. The rotorcraft 200 may remain on the landing pad 100 for a period of time, or may depart as soon as the battery 220 is sufficiently recharged.

Thus, an autonomous method of recharging the battery 220 is realised. The rotorcraft 200 may be landed on the landing pad 100 (this may be performed autonomously by the rotorcraft 200), and the recharging system 10 then autonomously determines the position of the rotorcraft 200 and configures the electrical connection of the appropriate tiles 101 to 125 to the power supply 170 to allow the battery 220 to be recharged. Once the battery 220 is recharged, the rotorcraft 200 may take off to recommence its mission or to begin a new mission. For example, a mission plan may include schedule stops at conveniently located recharging stations 10.

The person skilled in the art will appreciate that variations may be made to the above described examples without departing from the scope of the present disclosure defined by the appended claims.

For example, the example implementations of the present disclosure described above relate to an unmanned aerial vehicle (UAV) such as a quadrotor, as an example implementation of rotorcraft 200. However, example implementations may be practised with other rotorcraft and other aircraft including fixed wing aircraft. The aircraft may be manned or unmanned. The recharging station 10 may be used to recharge a variety of types of aircraft that visit the recharging station 10, and not just a single type. Additional power supplies may be provided such that a landing pad 100 may accommodate and recharge more than a single aircraft.

The rotorcraft 200 described above are provided with four shielded rotors 201 to 204. Other configurations are possible, such as having from three to six rotors, and such as having unshielded rotors.

The rotorcraft 200 described above are provided with feet 211 to 214 to provide support when the rotorcraft 200 is on the ground. Although examples with four feet have been described, other arrangements are possible such as three to six support legs and feet. The feet 211 to 214 provide a convenient means for housing the terminals 221 and 222. In the examples described above, a pair of the feet 211, 212 is configured to mate electrically with a corresponding electrical terminal 221, 222 while the remaining feet 213 and 214 may not include electrical terminals on their underside. However, at least two and up to the entirety of the feet 211 to 214 may each include an associated electrical terminal, and may each be used as primary or redundant connections. Where wheeled arrangements are used on aircraft, the terminals 221 and 222 may be provided using conductive wheels or an extending member to contact the landing pad once in position on the parking pad.

An example implementation of the present disclosure is described above where the separation of the positive and negative terminals 221 and 222 is greater than the diagonal distance across a square tile 101 to 125, but less than twice the width of a tile 101 to 125. This ensures that the two terminals 221 and 222 will contact adjacent tiles 101 to 125, thereby reducing the time required for the controller 190 to determine the position of the rotorcraft 200 because only adjacent tiles 101 to 125 need be set as the negative tile during the inner loop 306. Where this arrangement is not used, for example because a different type of aircraft positions itself on the landing pad 100, a fuller determination of the aircraft position may be performed by the controller 190. To test all combinations of tiles 101 to 125 as positive and negative tiles, the inner loop 306 may see a sequence where all tiles 101 to 125 other than the positive tile are set as the negative tile.

The controller 190 may perform a further test at step 312 where the circuit condition is tested. The controller 190 may look for a closed circuit but also react if an incorrect polarity is determined. This situation corresponds to the tile 108 beneath the positive terminal 221 being set as the negative tile and the tile 102 beneath the negative terminal 222 being set as the positive tile. If this situation is found, the controller 190 may simply exit the inner loop 306 and the outer loop 308 and proceed to swap the tiles' connections to the positive and negative connections 131 and 132 such that the correct polarity is ensured. The method may then continue to step 314 where the rotorcraft 200 is recharged.

The above methods may be modified such that the controller sets the negative tile in the outer loop 304 and sets the positive tile in the inner loop 306.

The example landing pad 100 described above has an array of twenty-five congruent square tiles 101 to 125 arranged to form a regular five by five grid with five rows and five columns. Other grid patterns and sizes are possible. Also, as noted above, the tiles 101 to 125 need not be square. Other polygons that tile readily may be chosen, such as triangles, squares, rectangles and hexagons. Irregular polygons and tiles with curved sides may be used. Tiles may have more than a single size and/or more than a single shape. For example, tiling maybe achieved using octagons and squares. Regular side-by side arrangements may be used, such as the array shown in the figures, although other arrangements such as a herringbone arrangement of rectangular tiles may be used.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific example implementations provided herein and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An aircraft recharging station comprising:
a parking surface disposed for an aircraft provided with a battery to rest thereon, the battery being rechargeable, and the parking surface comprising conductive tiles;
a switching circuit configured to allow selectively an electrical connection between an electrical power supply and any two of the conductive tiles; and
a controller configured to determine a position of the aircraft on the parking surface to allow recharging of the battery by the electrical power supply, including the controller being configured to control the switching circuit to iteratively connect a different pair of the conductive tiles to the electrical power supply to provide a circuit including a positive tile and a negative tile connected to the electrical power supply, and test an electrical circuit condition of the circuit connected to the electrical power supply, until a closed circuit condition is determined, thereby indicating that the aircraft is positioned on the positive tile and the negative tile, and that the battery is thereby rechargeable by the electrical power supply,
wherein the controller being configured to control the switching circuit to iteratively connect a different pair of the conductive tiles to the electrical power supply includes being configured to perform one or more iterations of an outer loop and an inner loop,
wherein the outer loop includes the controller being configured to control the switching circuit to iteratively connect either a positive output or a negative output of the electrical power supply to different ones of the conductive tiles, thereby making the different ones of the conductive tiles the positive tile or the negative tile respectively, wherein after each iteration of the controller making a conductive tile the positive tile or the negative tile, the inner loop includes the controller being configured to control the switching circuit to iteratively connect the other of the positive output or the negative output of the electrical power supply to different ones of the conductive tiles other than the conductive tile made the positive tile or the negative tile, thereby making the different ones of the conductive tiles the other of the positive tile or the negative tile, and wherein the controller is configured to perform the one or more iterations of the outer loop and the inner loop until the closed circuit condition is determined.

2. The aircraft recharging station of claim 1, wherein each conductive tile of the conductive tiles is provided with an electrical connector and insulated from other, adjacent conductive tiles of the conductive tiles, wherein the controller being configured to control the switching circuit to iteratively connect either the positive output or the negative output of the electrical power supply to different ones of the conductive tiles includes being configured to control the switching circuit to iteratively connect either the positive output or the negative output of the electrical power supply to the electrical connector of different ones of the conductive tiles, and wherein the controller being configured to control the switching circuit to iteratively connect the other of the positive output or the negative output of the electrical power supply to different ones of the conductive tiles includes being configured to control the switching circuit to iteratively connect the other of the positive output or the negative output of the electrical power supply to the electrical connector of different ones of the conductive tiles.

3. The aircraft recharging station of claim 1, wherein the aircraft is provided with a positive terminal and a negative terminal connected to the battery, the positive terminal and negative terminal both being arranged to be in contact with one or more of the conductive tiles when the aircraft is resting on the parking surface, and wherein the controller is configured to control the switching circuit to iteratively connect a different pair of the conductive tiles to the power supply and test the electrical circuit condition until the closed circuit condition is determined, thereby indicating that the positive output of the electrical power supply is connected to the positive terminal of the aircraft via the positive tile, and the negative output of the electrical power supply is connected to the negative terminal of the aircraft via the negative tile.

4. The aircraft recharging station of claim 1, wherein the conductive tiles are congruent and arranged in a repeating pattern, and wherein the controller being configured to control the switching circuit to iteratively connect the other of the positive output or the negative output of the electrical power supply includes being configured to control the switching circuit to iteratively connect the other of the positive output or the negative output to different ones of the conductive tiles adjacent to the conductive tile made the positive tile or the negative tile.

5. The aircraft recharging station of claim 1, wherein the parking surface comprises an array of the conductive tiles that are arranged to fill the parking surface.

6. The aircraft recharging station of claim 1, wherein the aircraft is configured to contact the parking surface through a plurality of landing feet, landing wheels, or extending members, and wherein the controller is configured to determine the position of the aircraft in response to a landing event in which the plurality of landing feet, landing wheels, or extending members makes contact with the landing pad, the landing event being detected using at least one of pressure sensitive switches, video monitoring, audio monitoring, or breaking a light beam.

7. A system comprising:

an aircraft recharging station comprising a parking surface including conductive tiles in the shape of squares; and an aircraft comprising a battery that is rechargeable and connected to a positive terminal and a negative terminal that are both arranged to be in contact with one or more of the conductive tiles when the aircraft is resting on the parking surface, the positive terminal being separated from the negative terminal by a distance greater than the length of a longest span across a conductive tile of the parking surface but less than twice the width of a conductive tile of the parking surface, wherein the aircraft recharging station is configured to determine a position of the aircraft on the parking surface to allow recharging of the battery by an electrical power supply, including being configured to iteratively connect a different pair of the conductive tiles to the electrical power supply to provide a circuit including a positive tile and a negative tile connected to the electrical power supply, and test an electrical circuit condition of the circuit connected to the electrical power supply, until a closed circuit condition is determined, thereby indicating that the aircraft is positioned on the positive tile and the negative tile, and that the battery is thereby rechargeable by the electrical power supply, wherein the aircraft recharging station being configured to iteratively connect a different pair of the conductive tiles to the electrical power supply includes being configured to perform one or more iterations of an outer loop and an inner loop, wherein the outer loop includes the aircraft recharging station being configured to iteratively connect either a positive output or a negative output of the electrical power supply to different ones of the conductive tiles, thereby making the different ones of the conductive tiles the positive tile or the negative tile respectively, wherein after each iteration of the aircraft recharging station making a conductive tile the positive tile or the negative tile, the inner loop includes the aircraft recharging station being configured to iteratively connect the other of the positive output or the negative output of the electrical power supply to different ones of the conductive tiles other than the conductive tile made the positive tile or the negative tile, thereby making the different ones of the conductive tiles the other of the positive tile or the negative tile, and wherein the aircraft recharging station is configured to perform the one or more iterations of the outer loop and the inner loop until the closed circuit condition is determined.

8. The system of claim 7, wherein the aircraft is a rotorcraft or a fixed-wing craft.

9. The system of claim 7, wherein the aircraft is an unmanned aerial vehicle (UAV).

10. The system of claim 7, wherein the positive terminal and negative terminal of the aircraft are in the form of landing feet, landing wheels, or extending members.

11. A method of recharging a battery of an aircraft using a recharging station comprising a parking surface disposed for the aircraft to rest thereon, the battery being rechargeable, the parking surface comprising conductive tiles, and the method comprising:
- determining a position of the aircraft on the parking surface, including iteratively connecting a different pair of the conductive tiles to an electrical power supply of the recharging station to provide a circuit including a positive tile and a negative tile connected to the electrical power supply, and testing an electrical circuit condition of the circuit connected to the electrical power supply, until a closed circuit condition is determined, thereby indicating that the aircraft is positioned on the positive tile and the negative tile, and that the battery is thereby rechargeable by the electrical power supply; and
- recharging the battery using the electrical power supply as connected to the aircraft via the positive tile and the negative tile,
- wherein iteratively connecting a different pair of the conductive tiles to an electrical power supply includes performing one or more iterations of an outer loop and an inner loop,
- wherein the outer loop includes iteratively connecting either a positive output or a negative output of the electrical power supply to different ones of the conductive tiles, thereby making the different ones of the conductive tiles the positive tile or the negative tile respectively,
- wherein after each iteration of making a conductive tile the positive tile or the negative tile, the inner loop includes iteratively connecting the other of the positive output or the negative output of the electrical power supply to different ones of the conductive tiles other than the conductive tile made the positive tile or the negative tile, thereby making the different ones of the conductive tiles the other of the positive tile or the negative tile, and
- wherein the one or more iterations of the outer loop and the inner loop are performed until the closed circuit condition is determined.

12. The method of claim 11, wherein the aircraft is provided with a positive terminal and a negative terminal connected to the battery, the positive terminal and negative terminal both being arranged to be in contact with one or more of the conductive tiles when the aircraft is resting on the parking surface, and
- wherein iteratively connecting a different pair of the conductive tiles and testing an electrical circuit condition are performed until the closed circuit condition is determined, thereby indicating that the positive output of the electrical power supply is connected to the positive terminal of the aircraft via the positive tile, and the negative output of the electrical power supply is connected to the negative terminal of the aircraft via the negative tile.

13. The method of claim 11, wherein iteratively connecting the other of the positive output or the negative output of the electrical power supply includes iteratively connecting the other of the positive output or the negative output to different ones of the conductive tiles adjacent to the conductive tile made the positive tile or the negative tile.

14. The method of claim 13, wherein in the outer loop, iteratively connecting either the positive output or the negative output of the electrical power supply includes in at least one iteration, selecting and connecting either the positive output or the negative output of the electrical power supply to a conductive tile adjacent to the tile made the positive tile or the negative tile in an immediately preceding iteration of the outer loop.

15. The method of claim 13, wherein in the inner loop, iteratively connecting the other of the positive output or the negative output of the electrical power supply includes in a plurality of iterations, selecting and connecting the other of the positive output or the negative output of the electrical power supply to different ones of the conductive tiles adjacent to the conductive tile made the positive tile or the negative tile, in turn in a clockwise or anti-clockwise direction.

* * * * *